US012152745B2

(12) United States Patent
Van De Sluis et al.

(10) Patent No.: US 12,152,745 B2
(45) Date of Patent: Nov. 26, 2024

(54) CUT-TO-MEASURE LIGHT EMITTING ASSEMBLY COMPRISING CONNECTED LIGHT STRIPS

(71) Applicant: SIGNIFY HOLDING B.V., Eindhoven (NL)

(72) Inventors: Bartel Marinus Van De Sluis, Eindhoven (NL); Leendert Teunis Rozendaal, Valkenswaard (NL); Marcellinus Petrus Carolus Michael Krijn, Eindhoven (NL); Michel Cornelis Josephus Marie Vissenberg, Roermond (NL)

(73) Assignee: SIGNIFY HOLDING, B.V., Eindhoven (NL)

( * ) Notice: Subject to any disclaimer, the term of this patent is extended or adjusted under 35 U.S.C. 154(b) by 0 days.

(21) Appl. No.: 18/031,539

(22) PCT Filed: Oct. 12, 2021

(86) PCT No.: PCT/EP2021/078129
§ 371 (c)(1),
(2) Date: Apr. 12, 2023

(87) PCT Pub. No.: WO2022/084098
PCT Pub. Date: Apr. 28, 2022

(65) Prior Publication Data

US 2024/0019091 A1 Jan. 18, 2024

(30) Foreign Application Priority Data

Oct. 19, 2020 (EP) .................................... 20202557

(51) Int. Cl.
*F21S 4/28* (2016.01)
*F21S 4/22* (2016.01)
(Continued)

(52) U.S. Cl.
CPC . *F21S 4/22* (2016.01); *F21S 4/28* (2016.01); *F21V 5/046* (2013.01); *F21V 23/001* (2013.01);
(Continued)

(58) Field of Classification Search
CPC .... F21S 4/22; F21S 4/28; F21V 5/046; F21V 23/001; F21V 23/005; H05B 47/17; F21Y 2103/10; F21Y 2105/14; F21Y 2105/10
See application file for complete search history.

(56) References Cited

U.S. PATENT DOCUMENTS 9,743,696 B1 8/2017 Ramsey
9,784,421 B1 * 10/2017 Petersen ................ H05B 45/46
(Continued)

FOREIGN PATENT DOCUMENTS

CN 107701935 A 2/2018
CN 108317420 A 7/2018
(Continued)

*Primary Examiner* — Alan B Cariaso

(57) ABSTRACT

A light-emitting assembly comprising a substrate adapted to be cut, a plurality of light strips and a first connection member extending longitudinally over at least part of the substrate for supplying power to the plurality of light strips is provided. A first group of linear light strips extend over the substrate from a first side of the first connection member, and a second group of linear light strips extend over the substrate from a second side, opposite to the first side, of the first connection member. The assembly further comprises a controller system configured to control a power supply to a light strip of the plurality of light strips via the first connection member. The plurality of light strips and/or the first connection member are adapted to be cut to customize a layout of the light-emitting assembly.

10 Claims, 4 Drawing Sheets

(51) Int. Cl.

| | |
|---|---|
| ***F21V 5/04*** | (2006.01) |
| ***F21V 23/00*** | (2015.01) |
| ***F21Y 103/10*** | (2016.01) |
| ***F21Y 105/10*** | (2016.01) |
| ***F21Y 105/14*** | (2016.01) |
| ***H05B 47/17*** | (2020.01) |

(52) U.S. Cl.

CPC ........... *F21V 23/005* (2013.01); *H05B 47/17* (2020.01); *F21Y 2103/10* (2016.08); *F21Y 2105/10* (2016.08); *F21Y 2105/14* (2016.08)

(56) References Cited

U.S. PATENT DOCUMENTS

| | | | | |
|---|---|---|---|---|
| 10,344,954 | B1 * | 7/2019 | Tischler | H05K 1/0274 |
| 2011/0254470 | A1 | 10/2011 | Penoyer | |
| 2014/0062316 | A1 | 3/2014 | Tischler et al. | |
| 2016/0366731 | A1 | 12/2016 | Palfreyman et al. | |
| 2020/0154538 | A1 * | 5/2020 | Smith | H05B 45/22 |

FOREIGN PATENT DOCUMENTS

| | | | |
|---|---|---|---|
| DE | 20319650 | U1 | 4/2004 |
| DE | 202009006935 | U1 | 9/2009 |
| EP | 2400822 | B1 | 3/2015 |
| WO | 2016096615 | A1 | 6/2016 |
| WO | 2020043727 | A1 | 3/2020 |

* cited by examiner

CUT-TO-MEASURE LIGHT EMITTING ASSEMBLY COMPRISING CONNECTED LIGHT STRIPS

CROSS-REFERENCE TO PRIOR APPLICATIONS

This application is the U.S. National Phase application under 35 U.S.C. § 371 of International Application No. PCT/EP2021/078129, filed on Oct. 12, 2021, which claims the benefit of European Patent Application No. 20202557.3, filed on Oct. 19, 2020. These applications are hereby incorporated by reference herein.

TECHNICAL FIELD

The present disclosure relates generally to the field of lighting solutions. More specifically, it relates to light-emitting assemblies allowing customizable layouts.

BACKGROUND

Luminous surfaces are planar, sheet-based light sources which enable a large variety of forms and shapes. The main challenge for luminous surfaces is to customize their shape and layout to the requests of a designer or architect. Specifically, there is a need for luminous surfaces allowing for easy customization and more variations in shape.

SUMMARY

It is therefore an object of the present invention to meet at least some of the above-mentioned goals, and to provide an improved light-emitting assembly for forming light-emitting surfaces with customizable layout.

This and other objects are achieved by means of a light-emitting assembly as defined in the appended independent claim. Other embodiments are defined by the dependent claims.

According to an aspect of the present disclosure, a light-emitting assembly is provided. The light-emitting assembly comprises a substrate which is adapted to be cut. The light-emitting assembly further comprises a plurality of light strips which are arranged on the substrate. A first connection member of the light-emitting assembly extends longitudinally over at least a part of the substrate. The first connection member is adapted for supplying power to the plurality of light strips. A first group of light strips extends over the substrate from a first side of the first connection member. A second group of light strips extends over the substrate from a second side, opposite to the first side, of the first connection member. The light-emitting assembly further comprises a control system. The control system is configured to control a power supply to a light strip of the plurality of light strips via the first connection member. The plurality of light strips and/or the first communication member are adapted to be cut to customize a layout of the light-emitting assembly.

A light-emitting assembly in accordance with the first aspect of the present disclosure may allow for forming light-emitting surfaces having a customizable layout. A user may cut away portions of the light-emitting assembly in order to adapt the layout of the light-emitting assembly to fit a desired shape or function while still keeping a functional light-emitting assembly in that power can be provided to the plurality of light strips via the first connection member.

The substrate may be a sheet of material having a surface adapted for supporting the light strips and the connection member. The substrate may be flexible. More specifically, the substrate may be rollable, such that the light-emitting assembly may be provided on a roll and/or may be used to cover a curved or angular surface of a 3D object. Alternatively, the substrate may be at least semi-rigid, as long as the substrate is adapted to be cut. For example, the substrate may comprise a film or a foil of e.g. a polymer or metal.

The light strips may each comprise a linear array of light nodes. Each light node may comprise a light source such as, for example, light-emitting diodes (LEDs). Each light node may also comprise multiple light sources. For instance, a light node may comprise a combination of red, green and blue LEDs enabling the light node to emit light with a wide range of possible colors.

A light strip may receive dedicated power signals/supply such that it can operate independently of other light strips of the plurality of light strips.

The connection member may comprise one or more (a plurality of) electrically conductive lines for providing power to the light strips. The communication member may for example be referred to as a bus or busbar.

The controller system may control power supply to one or several (such as all) of the light strips. By controlling the power supply, an intensity of light emitted by the controlled light strip or light strips may be controlled. The controller system may control the power supply to one or more light strips independently, or as a group.

According to some embodiments, the controller system may be configured to control an intensity of light emitted by a light strip, or at least a light node of a light strip of the plurality of light strips. According to some embodiments, the controller system may be configured to control a color of light emitted by a light strip, or at least a light node of a light strip of the plurality of light strips.

For example, the controller system may be configured to control individual light nodes of a light strip independently, or as a group, to emit light with a variable intensity and/or color. For example, the controller system may be configured to control individual light strips independently, or as a group, to emit light with a variable intensity and/or color.

For example, the intensity of light emitted by a light node or a light strip may be controlled by controlling the power supply to the light node or light strip.

According to some embodiments, the controller system may comprise a first controller in connection with the first connection member. The first controller may be configured to control the first and/or second groups of light strips.

In embodiments in which the first controller is configured to control one of the first and second groups of light strips, the controller system may comprise another controller which is configured to control the other group of light strips.

According to some embodiments, the controller system may further comprise a second controller in connection with the first connection member. The second controller may be configured to control the first and/or second groups of light strips. The first and second controllers may be arranged at different positions along the first connection member. In some variants, the first and second controllers may be arranged on opposite sides of the connection member.

In embodiments in which more than one controller, such as the first and the second controller, are in connection with the same connection member, the controller system may provide control of the light strips in connection with the connection member, even if the connection member is cut between two controllers. In other words, if the connection member is cut between the first controller and the second controller, the connection member may be divided in a first portion in connection with the first controller, and a second portion in connection with the second controller. The first controller may then control light strips in connection with the first portion of the connection member and the second controller may control light strips in connection with the second portion of the connection member.

If more than one controller is in contact with the same, intact/non-cut, connection member, control of the light strips in connection with the connection member may be divided between (some of) the controllers. One or more of the controllers may be inactivated, leaving one or more controllers activated to control the light strips.

According to some embodiments, the controller system may further comprise a plurality of local controllers. Each of the local controllers may be configured to control at least one light strip of the plurality of light strips.

The local controllers may be located near the connection member.

For example, a local controller may control individual light nodes in a light strip individually or as a group. A local controller may provide individual power or data to light nodes in a light strip connected with the local controller in order to adjust the light emitted by the light nodes.

The local controllers may communicate with other controllers of the controller system. For example, a first and/or second controller may coordinate control of several light strips. The first and/or second controller may provide instructions to local controllers, which in turn control light strips, or light nodes of light strips.

According to some embodiments, the controller system may further comprise a data line configured to carry data to a light strip of the plurality of light strips.

For example, the data line may be configured to carry control instructions to a light strip. The data line may be configured to carry instructions from a central controller (such as a first or second controller) to a local controller or to a light strip.

Data may be sent within the controller system to control light emitted by light strips or light nodes in groups or individually. For example, the data may be used to control the intensity of emitted light, and/or the color of emitted light.

According to some embodiments, the data line may be an integral part of the first connection member.

Alternatively, the data line may be arranged external to (or separate from) the first connection member. The data line may be arranged at a different position than the first connection member. Further, transmission of data between controllers within the controller system, and/or to light strips, may be wireless.

According to some embodiments, the light-emitting assembly may further comprise a second connection member. The second connection member may be configured to supply power to the first group of light strips. The second connection member may be arranged at a distance from the first connection member, along the first group of light strips (i.e. along a direction of extension of the light strips of the first group).

The second connection member may be used to provide power to the light strips of the first group.

The second connection member may provide that a light strip of the first group may be cut between the first and the second connection members, and still be provided with power. In other words, if a light strip of the first group is cut between a first connection member and a second connection member, the light strip may be divided in two portions, a first portion in connection with the first connection member, and a second portion in connection with the second connection member. The first portion may then receive power supply from the first connection member, and the second portion may receive power supply from the second connection member.

According to some embodiments, the controller system may further comprise an additional controller in connection with the second connection member. The additional controller may be configured to control light strips of the first group of light strips.

The additional controller may for example control portions of light strips of the first group that have been disconnected (cut) from the first connection member.

In embodiments which have more than one controller in connection with the same light strips, the control of the light strips may be divided between the controllers. One or more controllers may be inactivated, leaving one or more controllers to control the light strips.

For example, the additional controller may control power supply to the first group of light strips. The additional controller may send data to the first group of light strips. The additional controller may control an intensity and/or a color of light emitted by the first group of light strips.

According to some embodiments, at least some of the light strips of the first group of light strips may be configured to carry power and/or data along the light strip to the second connection member.

For example, power and/or data may be carried along at least some light strips from the first connection member to the second connection member, or vice versa. Portions of light strips of the first group that have been disconnected (cut) from the first connection member but are in connection with the second connection member may then receive power supply and/or data carried from the first connection member, via at least one light strip which is connected to both the first and the second connection member, to the second connection member. In other words, if a light strip cannot receive power supply and/or data from the first connection member, such light strip may receive the power supply and/or the data via the second connection member.

According to some embodiments, the controller system may be configured to receive information regarding the layout of the light-emitting assembly. The controller system may be further configured to control a light strip of the plurality of light strips based on the received information.

For example, the control system may provide dedicated power and/or data to a light strip based on the number of active (remaining) light nodes in the light strip. Active light nodes may be light nodes which are in contact with a connection member via a light strip. In other words, active light nodes may be light nodes which are not cut away from a power (and/or data) supply.

According to some embodiments, the controller system may be configured to receive the information regarding the layout of the light-emitting assembly from a configuration input. According to some embodiments, the controller system may be configured to receive the information regarding the layout of the light-emitting assembly from a camera input. The layout of the light-emitting assembly may then be determined based on photogrammetry. For example, during camera-based configuration, the light-emitting assembly may be controlled such that it renders a known light output or (spatial or temporal) pattern. By processing captured camera images based on the known light output, the orientation and lay-out of the light-emitting assembly can be determined.

For example, in a configuration step, a user may input information regarding the layout/shape of the light-emitting assembly after customization or cut-to-measure.

According to some embodiments, a light strip may comprise a plurality of light nodes. The light strip may be configured to transmit a signal indicating a number of active light nodes in the light strip to the controller system. The controller system may be configured to determine, from signals indicating the number of active light nodes received from the plurality of light strips, a layout in the light-emitting assembly.

For instance, cutting a light strip, or a connection member, may cause a short cut event between a serial data line and a dedicated feedback line within the light strip or connection member. The dedicated feedback line may feed back serial data to the controller system, for example to a local controller in connection with the cut light strip. Based on the fed back serial data received by the controller, the active length of a light strip or connection member can be determined. If, e.g. upon power-on, a controller of the controller system receives reports/information from all remaining, i.e. not cut away, light strips, the layout of the light-emitting assembly after customization/cut-to-measure may be determined.

According to some embodiments, a light strip of the plurality of light strips may further comprise an optic device adapted to be cut.

The optic device may be a linear optic device in embodiments in which the light strips are linear. The optic device may be flexible. For example, the optic device may be a batwing lens.

According to some embodiments, the first group of light strips may extend on the substrate at an at least substantially right angle from the first connection member. According to some embodiments, the second group of light strips may extend on the substrate at an at least substantially right angle from the first connection member.

Alternatively, the connection member may be arranged diagonally, at an angle different from a right angle, relative to the light strips of the first and/or second group. Alternatively, the connection member may be non-linear, such as curved or angled.

It is noted that other embodiments using all possible combinations of features recited in the above described embodiments may be envisaged. Thus, the present disclosure also relates to all possible combinations of features mentioned herein.

BRIEF DESCRIPTION OF DRAWINGS

Exemplifying embodiments will now be described in more detail, with reference to the following appended drawings.

As illustrated in the figures, the sizes of the elements and regions may be exaggerated for illustrative purposes and, thus, are provided to illustrate the general structures of the embodiments. Like reference numerals refer to like elements throughout.

DETAILED DESCRIPTION

Exemplifying embodiments will now be described more fully hereinafter with reference to the accompanying drawings in which currently preferred embodiments are shown. The invention may, however, be embodied in many different forms and should not be construed as limited to the embodiments set forth herein; rather, these embodiments are provided for thoroughness and completeness, and fully convey the scope of the invention to the skilled person.

Figure 1:
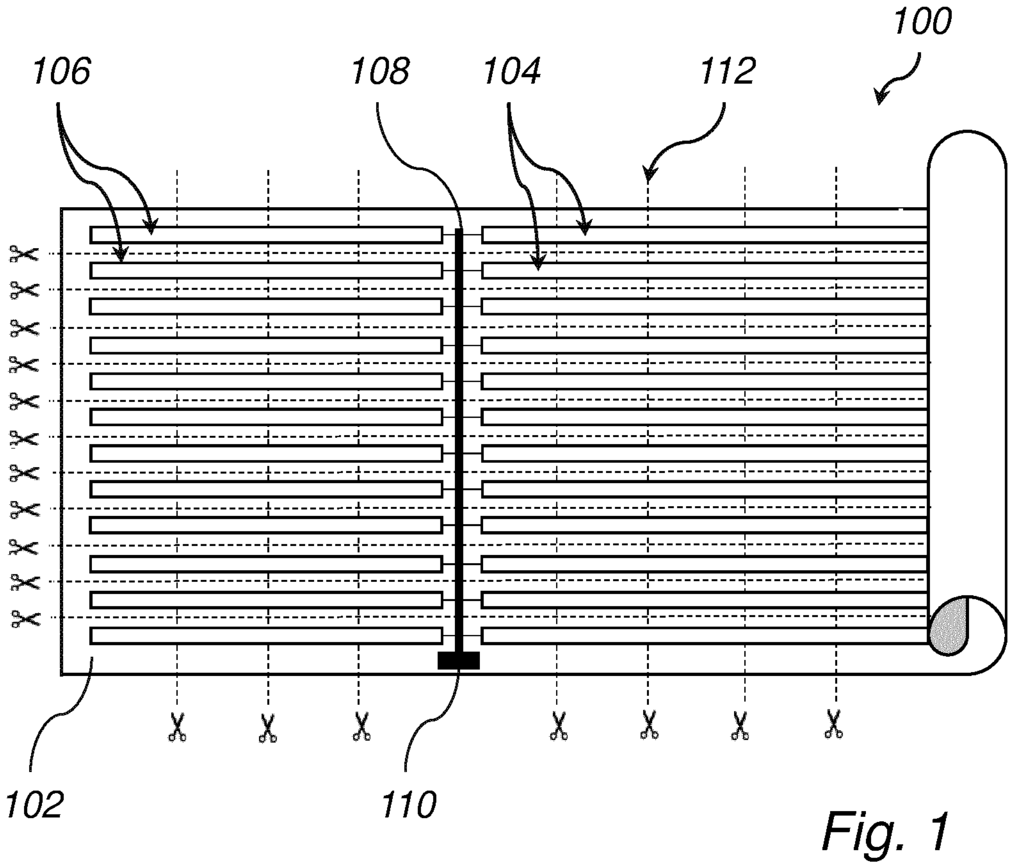
FIG. 1 shows a light-emitting assembly, in accordance with some embodiments.

With reference to FIG. 1, a light-emitting assembly 100, in accordance with some embodiments, will be described.

FIG. 1 is an illustration of a light-emitting assembly 100 in accordance with some embodiments. The light-emitting assembly 100 comprises a flexible (rollable) substrate 102, such that the light emitting assembly 100 may be provided on a roll.

The light-emitting assembly 100 further comprises a first connection member 108, which extends longitudinally across the substrate 102. A first group of (linear) light strips 104 ("first light strips 104") extend, laterally, across the substrate 102 from a first side of the first connection member 108. A second group of (linear) light strips 106 ("second light strips 106") extend, laterally, across the substrate 102 from a second side of the first connection member 108. In the present embodiment, the light strips 104 of the first group extend in parallel, and at least substantially orthogonally to (or perpendicular to) the first connection member 108. The light strips 106 of the second group extend in parallel, and at least substantially orthogonally, to the first connection member 108, in a direction opposite to the direction of extension of the first group of light strips 104. This arrangement of the first group of light strips 104 and the second group of light strips 106 may be described as a 2D-lighting array.

The first connection member 108 connects all the first light strips 104 and the second light strips 106. The first connection member 108 is configured to provide power supply (distribute power) to the first light strips 104 and the second light strips 106. A controller 110, in connection with the first connection member 108, is configured to control the power supply to the first light strips 104 and the second light strips 106.

The substrate 102, the first light strips 104, the second light strips 106 and the connection member 108 are all adapted to be cut. A user may customize the layout of the light-emitting assembly 100 by cutting the substrate 102 with the light strips 104, 106 and the connection member 108.

The substrate 102 is further provided with visual indications ("cut here marks") 112, which indicate to a user positions at which it is suitable to cut the substrate 102. A user may further be instructed or informed about the locations of the connection member 108 and the controller 110 such that the user will start cutting away unneeded parts at the other end and leave the connection member 108 and its connection to the controller 110 intact as much as possible. Such instructions may be provided separately (such as in a paper/digital user manual) or may be clearly indicated on the (back of) the light-emitting assembly 100.

Figure 2:
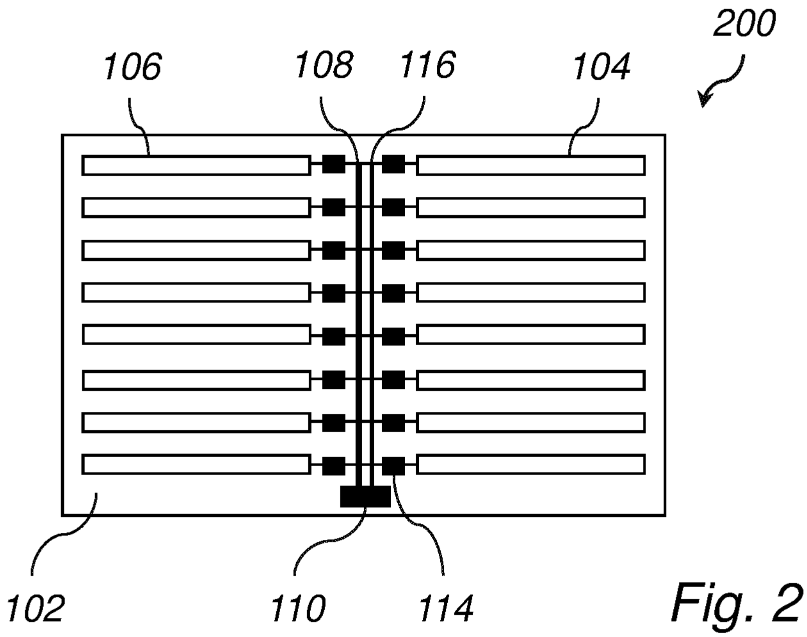
FIG. 2 is a close-up view of a portion of a light-emitting assembly, in accordance with some embodiments.
Figure 3:
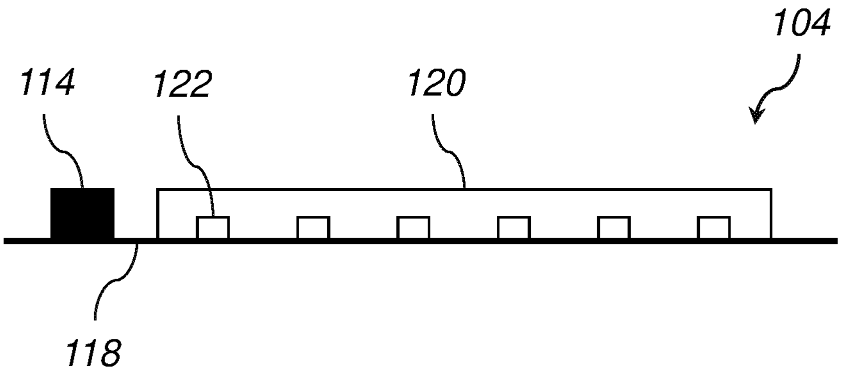
FIG. 3 illustrates a portion of a light strip, in accordance with some embodiments.

With reference to FIGS. 2 and 3, a controller system of a light-emitting assembly 200, in accordance with some embodiments, will be described.

FIG. 2 shows a portion of a light-emitting assembly 200. The light-emitting assembly 200 may be equivalent to the light-emitting assembly 100, described with reference to FIG. 1, except that the controller system of the light-emitting assembly 200 further comprises a plurality of local controllers 114 and a data line 116.

FIG. 3 illustrates a portion of a light strip 104, in accordance with some embodiments. The light strip 104 may be equivalent to any of the light strips 104, 106 described above with reference to FIG. 1. The light strip 104 comprises a local controller 114. As is shown in FIG. 2, the local controller 114 may instead be external to the light strip. The light strip 140 further comprises a plurality of light nodes 122 arranged in a linear array. An electrically conductive line 118 connects the light nodes. The electrically conductive line 118 may carry power and/or data to each light node 122. The light strip 104 may optionally comprise a (linear) optic device 120, such as a batwing lens.

A controller system will be described with reference to both FIGS. 1 and 2. In FIG. 1, each of the light strips 104, 106 of the light-emitting assembly 200 is connected to a local controller 114, which is located near the connection member 108 and the data line 116. The first controller 110 is configured to distribute power to the light strips 104, 106 via the connection member 108, and to distribute data to the local controllers 114 of each light strip 104, 106, via the data line 116.

The controller system may be configured to control an intensity and/or a color of light emitted by the light strips 104, 106, or of individual light nodes 120 of the light strips 104, 106.

Intensity control may be managed by controlling the power supply to the light strips 104, 106 or to individual light nodes 122. In some embodiments, the power supply to a group is connected in parallel, such that the power to all light strips in a group is controlled simultaneously.

Intensity control may be performed by sending data (instructions) to control each light node, group of light nodes, light strips, or group of light strips independently. A combination of power control and data control of the intensity may also be implemented. Color control may be performed for light strips (and light nodes) which are configured to emit light with a variable color. The color of the emitted light may be controlled by sending data (instructions) to local controllers 114, light strips 104, 106 or individual light nodes 122.

For example, in some embodiments the controller system may control the color and/or intensity of light emitted by each individual light node 120. The first (central) controller 110 may send out control data, such as an array of color or intensity values, via the data line 116, to the local controllers 114 of each light strip 104, 106. Each local controller 114 may receive its corresponding part of the color/intensity control data, or it may have means to select a specific part from a received entire array of control values (e.g. color and/or intensity values). The local controller 114 may feed the relevant portion of control values to the light nodes 120 of the light strip 104, 106. For example, the light strips 104, 106 may comprise a local data line, which may be incorporated with the connection line 118. Each light node 120 may have its own controller (not illustrated), which may control the light source(s) of the light node according to received control data.

In some embodiments, each local controller (or line controller) may have means to determine their current active line length, i.e. the number of active lighting nodes 120 in the light strip 104. For instance, cutting a light strip 104 may cause a data line shortcut event feeding back to the local controller 114, thereby enabling the central (first) controller 110 to determine the active line length. If (upon power-on) the central controller 110 receives reports from all (remaining, not cut away) local controllers 114, the lay-out of the light-emitting assembly 200 (after cut-to-measure) can be determined. Alternatively, information regarding the layout may be received from a configuration or camera measurement input. Based on the layout, the light content (or light distribution) may be adjusted, e.g. scaled, rotated, morphed. The controller system may be configured to control (send appropriate control values to) individual light nodes or light strips based on the known layout.

In some embodiments, the data line may form an integrated part of the connection member.

In some embodiments, the controller system may comprise different data line setups. For example, in some embodiments, data lines may only be provided to some light strips. Data lines may be configured to provide data to one or more light strips. As an alternative, some (or all) data provision between controllers or to light strips or light nodes may be performed using wireless connections.

Figure 4:
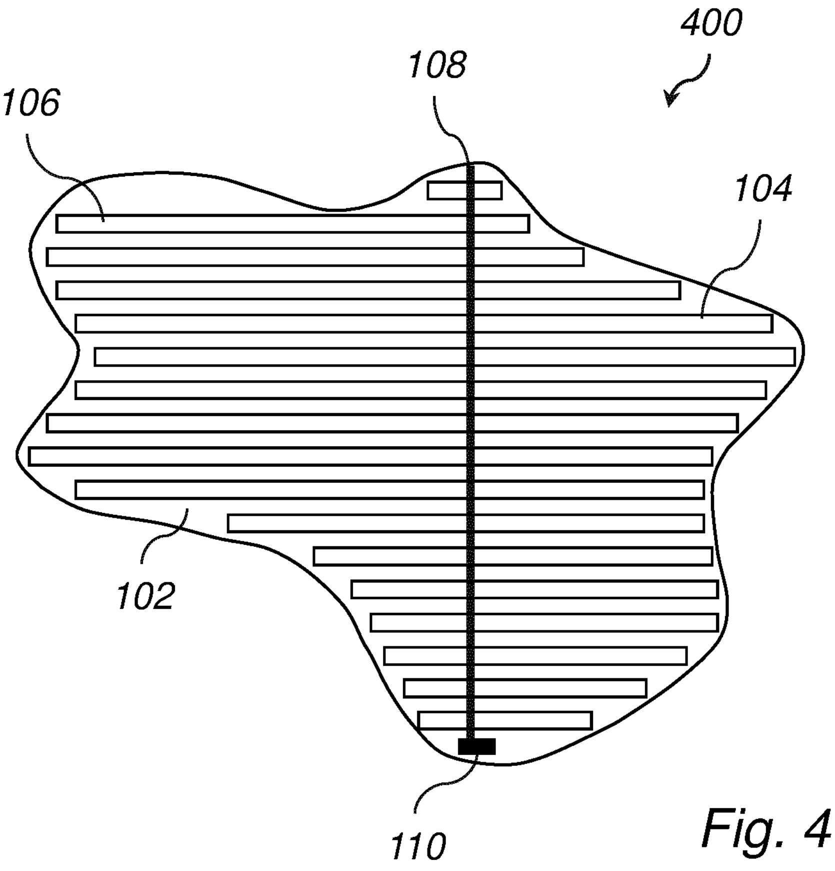
FIG. 4 illustrates an example of light-emitting assembly with a customized layout, in accordance with some embodiments.

With reference to FIG. 4, a light-emitting assembly 400 with a customized layout, in accordance with some embodiments, will be described.

The light-emitting assembly 400 may be equivalent to any of the light-emitting assemblies 100, 200, described above with reference to FIGS. 1 and 2. However, FIG. 4 illustrates the light-emitting assembly 400 after its shape/layout has been customized.

The substrate 102, the first light strips 104, the second light strips 106 and the first connection member 108 have been cut to customize the shape/layout of the light-emitting assembly 400. The light strips 104, 106 and the controller 110 are still connected to the connection member 108 so that the connection from the controller 110 to each (remaining) light strip remains intact. Prior to cutting, the user may optimize the orientation of the desired shape with respect to the connection member 108, in such a way that light strips 104, 106 (and their light nodes) optimally cover the luminous surface shape. This may minimize the luminous surface area size where no light nodes are present, and thereby dark areas may be avoided. For example, a user may position and rotate the light-emitting assembly relative to the desired shape such that the connection member 108 is positioned at a central position, or at a position which is (known to be) the longest section of the customized shape.

In the illustrated embodiments, the connection member 108 is arranged in a direction (substantially) orthogonal to the direction of the linear light strips. However, the connection member 108 may also be arranged at some diagonal, i.e. non-orthogonal, directions. The connection member may even be non-linear, as long as it spans the light strips.

Figure 5:
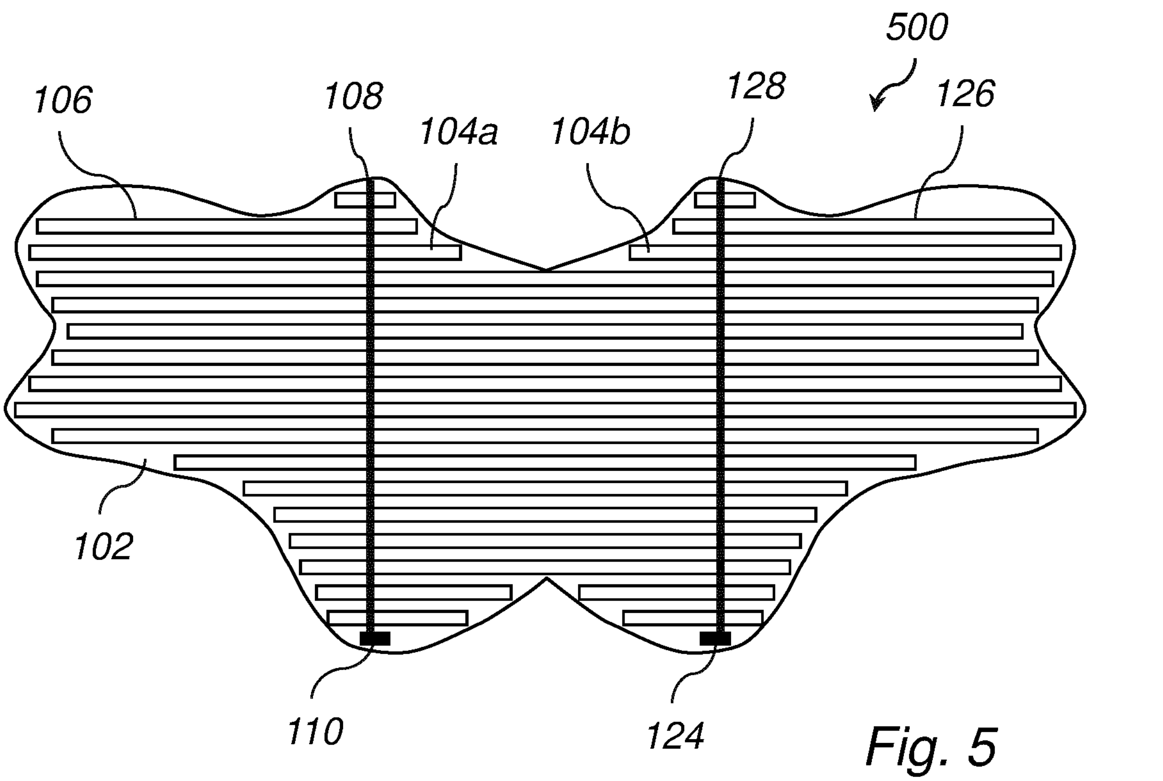
FIG. 5 illustrates an example of light-emitting assembly with a customized layout and having a second connection member, in accordance with some embodiments.

With reference to FIG. 5, a light-emitting assembly 500 having a second connection member, in accordance with some embodiments, will be described.

For some layouts, a single connection member 108 may not suffice to provide power/control to all light strips. In FIG. 5, the light-emitting assembly 500 has been cut to a shape having a butterfly-like shape. The light-emitting assembly 500 may be equivalent to assemblies described above, with reference to the preceding Figures, except that it comprises a second connection member 128 arranged in contact with the first light strips, an additional controller 124 in connection with the second connection member 128, and a third group of (third) light strips 126, extending from the second connection member 128 on the opposite side as compared to the side of the second connection member from which the first light strips extend.

Due to the desired shape, some of the first light strips have been cut between the first connection member 108 and the second connection member 128. The first connection member 108 and the first controller 110 may provide power/control to a first portion 104*a* of a first light strip which has been cut. The second connection member 128 and the additional controller 124 may provide power/control to the second portion 104*b* of the same light strip.

Figure 6:
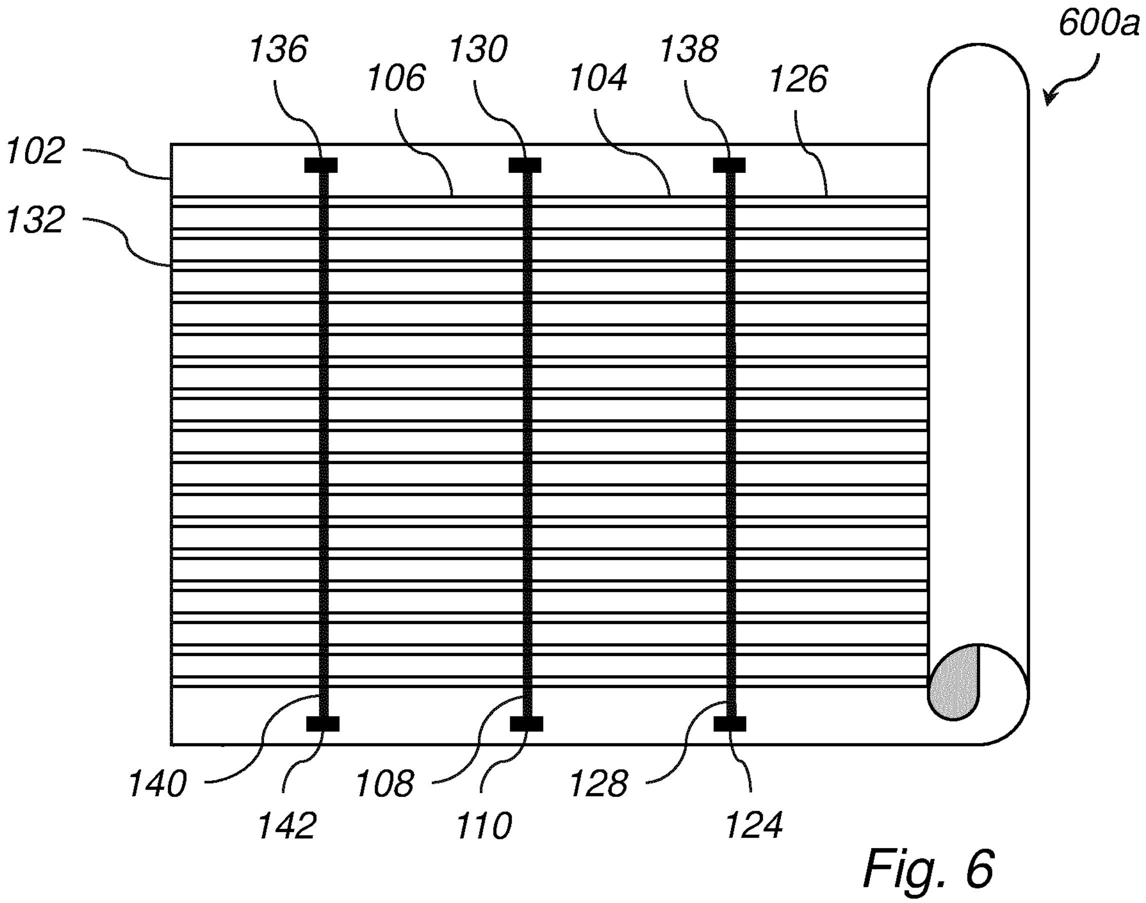
FIG. 6 shows a light-emitting assembly having multiple connection members and controllers, in accordance with some embodiments.
Figure 7:
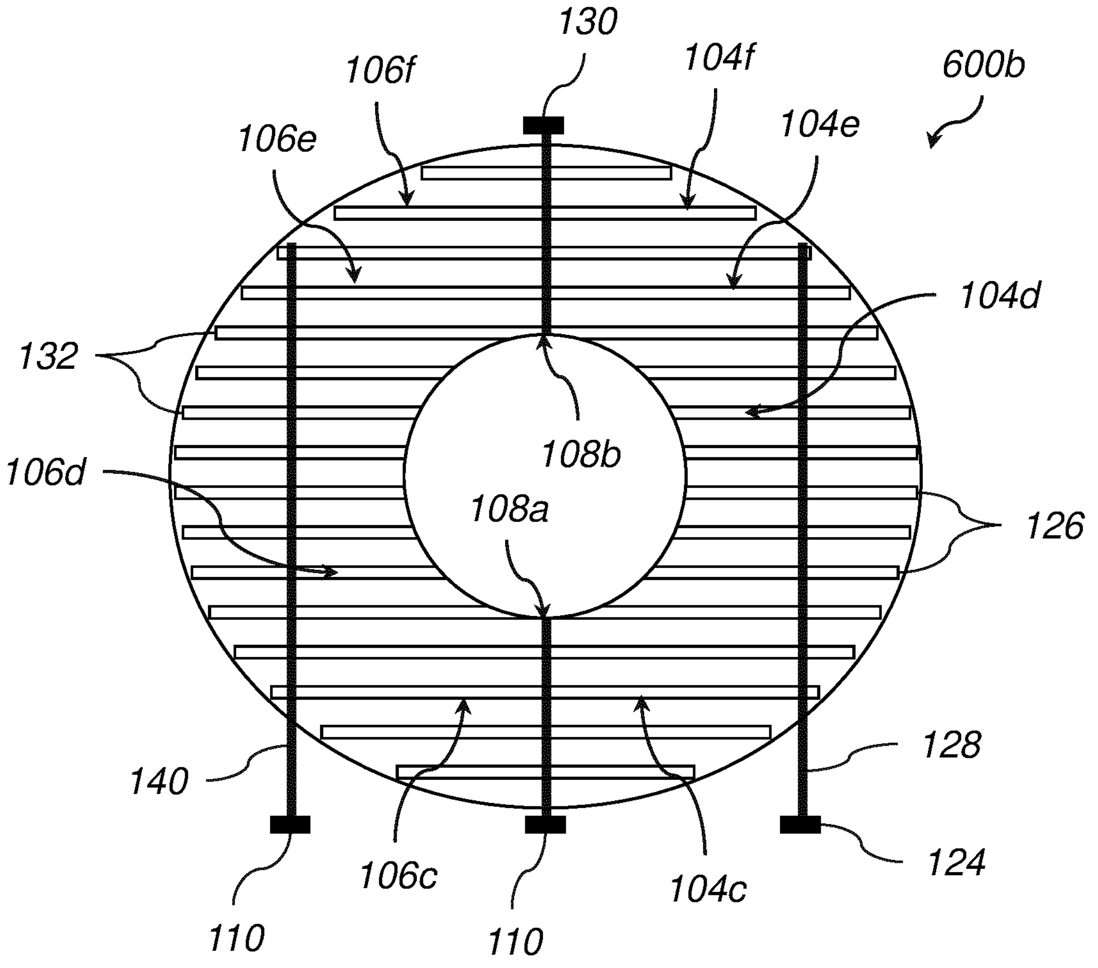
FIG. 7 illustrates an example of a light-emitting assembly with a customized layout formed from the light-emitting assembly shown in FIG. 6.

With reference to FIGS. 6 and 7, a light-emitting assembly allowing for a customized layout, in accordance with some embodiments, will be described.

FIG. 6 illustrates a light-emitting assembly 600*a* having multiple connection members and controllers, before customization. FIG. 7 illustrates the same light-emitting assembly 600*b* after customization of its shape.

When a light-emitting assembly is delivered on a roll, connection members may be provided at even intervals. When more than one connection member is present in a customized layout, the user may choose to use all the connection members, or only one or a subset. Using multiple data lines (either incorporated in connection lines or separately) may be necessary for difficult shapes, such as the donut shape illustrated in FIG. 7.

The light-emitting assembly 600*a* comprises a third connection member 142, connected to the second group of light strips 106. A fourth group of light strips 132 ("fourth light strips 132") are connected to the third connection member 142, at the opposite side from the second light strips 106. Further, each of the three connection members 108, 128, 140 comprises a (first) controller 110, 124, 142, arranged at one end of the connection member 108, 128, 140, and a second controller 130, 138, 136, arranged at the opposite end of the connection member 108, 128, 140. This arrangement of connection members and multiple controllers may allow for even more complex shapes, such as the donut shape illustrated in FIG. 7.

The customized light-emitting assembly 600*b* of FIG. 7 has been cut to a donut shape, i.e. a round shape having a round hole in the center. This hole cuts the first connection member into a first portion 108*a* and a second portion 108*b*. The second controller 130 provides power and control to at least the first and second light strips 104*f*, 106*f*, which are only in connection with the second portion 108*b* of the first connection member.

As the second and third connection members 128, 140 are intact, the second controllers 138, 136 of the second and third connection members 128, 140 are not necessary for the power supply or control of any light strips. Therefore, the second controllers 138, 136 have been cut away, and each light strip still has an intact connection to a controller via a connection member.

For structures as shown in FIG. 7, another solution is to allow light strips to carry power/data along the light strip to another connection member. Then, only one controller, such as the first controller 110, would be necessary. For example, power/data may be provided through the first portion 108*a* of the first connection member. The power/data may then be carried along one or more of the first light strips 104*c* in connection with the first portion 108*a* to the second connection member 128. Similarly, power/data may be carried along one or more of the second light strips 106*c* in connection with the first portion 108*a* to the third connection member 140. The second and third connection members 128, 140 may distribute power/data to any light strips 104*d*, 106*d*, 126, 132 which are in connection with the second and third connection members 128, 140. Power/data may then be carried from the second connection member 128 to the second portion 108*b* of the first connection member, along one or more of the first light strips 104*e* in connection with the second portion 108*b*, and/or from the third connection member 140 along one or more of the second light strips 106*e* in connection with the second portion 108*b*. Finally, power/data may be provided to the first and second light strips 104*f*, 106*f* which are only in connection with the second portion 108*b* of the first connection member.

The person skilled in the art realizes that the present invention by no means is limited to the preferred embodiments described above. On the contrary, many modifications and variations are possible within the scope of the appended claims.

Although features and elements are described above in particular combinations, each feature or element can be used alone without the other features and elements or in various combinations with or without other features and elements.

Additionally, variations to the disclosed embodiments can be understood and effected by the skilled person in practicing the claimed invention, from a study of the drawings, the disclosure, and the appended claims. In the claims, the word "comprising" does not exclude other elements, and the indefinite article "a" or "an" does not exclude a plurality. The mere fact that certain features are recited in mutually different dependent claims does not indicate that a combination of these features cannot be used to advantage.

The invention claimed is:

1. A light-emitting assembly comprising;

a substrate adapted to be cut;

a plurality of light strips;

a first connection member extending longitudinally over at least part of said substrate for supplying power to the plurality of light strips, wherein a first group of light strips extend over the substrate from a first side of said first connection member and a second group of light strips extend over the substrate from a second side, opposite to said first side, of said first connection member;

a second connection member configured to supply power to said first group of light strips, said second connection member being arranged at a distance from said first connection member along said first group of light strips, wherein at least some of said light strips of said first group of light strips are configured to carry power and/or data along the light strip to said second connection member, and a controller system configured to control a power supply to a light strip of said plurality of light strips via said first connection member;

wherein said plurality of light strips and/or said first connection member are adapted to be cut to customize a layout of the light-emitting assembly;

wherein said controller system comprises a first controller in connection with said first connection member, said first controller being configured to control the first group of light strips and/or the second group of light strips; and wherein said controller system further comprises a second controller in connection with said first connection member, said second controller being configured to control the first group of light strips and/or the second group of light strips, and wherein said first controller and said second controller are arranged at different positions along said first connection member.

2. The light-emitting assembly of claim 1, wherein said controller system is further configured to control an intensity and/or a color of light emitted by a light strip, or at least a light node of a light strip of said plurality of light strips.

3. The light-emitting assembly of claim 1, wherein said controller system comprises a plurality of local controllers, wherein each of said plurality of local controllers is configured to control at least one light strip of said plurality of light strips.

4. The light-emitting assembly of claim 1, wherein said controller system further comprises a data line configured to carry data to a light strip of said plurality of light strips.

5. The light-emitting assembly of claim 4, wherein said data line is an integral part of said first connection member.

6. The light-emitting assembly of claim 1, wherein said controller system is configured to receive information regarding the layout of the light-emitting assembly and control a light strip of said plurality of light strips based on said information.

7. The light-emitting assembly of claim 6, wherein said controller system is configured to receive said information regarding the layout of the light-emitting assembly from a configuration input or a camera input.

8. The light-emitting assembly of claim 1, wherein a light strip of said plurality of light strips further comprises an optic device adapted to be cut.

9. The light-emitting assembly of claim 1, wherein said first group of light strips and/or said second group of light strips extend on the substrate at an at least substantially right angle from said first connection member.

10. A light-emitting assembly comprising:

a substrate adapted to be cut;

a plurality of light strips;

a first connection member extending longitudinally over at least part of said substrate for supplying power to the plurality of light strips, wherein a first group of light strips extend over the substrate from a first side of said first connection member and a second group of light strips extend over the substrate from a second side, opposite to said first side, of said first connection member;

a second connection member configured to supply power to said first group of light strips, said second connection member being arranged at a distance from said first connection member along said first group of light strips, wherein at least some of said light strips of said first group of light strips are configured to carry power and/or data along the light strip to said second connection member, and a controller system configured to control a power supply to a light strip of said plurality of light strips via said first connection member;

wherein said plurality of light strips and/or said first connection member are adapted to be cut to customize a layout of the light-emitting assembly;

wherein a light strip comprises a plurality of light nodes and is configured to transmit a signal indicating a number of active light nodes in the light strip to said controller system;

wherein said controller system is configured to, from signals indicating the number of active light nodes received from the plurality of light strips, determine a layout of the light-emitting assembly.

* * * * *